(12) United States Patent
Birolini et al.

(10) Patent No.: US 10,532,360 B2
(45) Date of Patent: Jan. 14, 2020

(54) SYSTEM FOR MANAGEMENT OF RACK AND TUBE POSITIONS FOR CLINICAL CHEMISTRY LABORATORIES

(71) Applicant: OMNILAB TECHNOLOGIES S.R.L., Milan (IT)

(72) Inventors: Luca Birolini, Segrate (IT); Christian Otto, Palazzo Pignano (IT)

(73) Assignee: OMNILAB TECHNOLOGIES S.R.L., Milan (MI) (IT)

( * ) Notice: Subject to any disclaimer, the term of this patent is extended or adjusted under 35 U.S.C. 154(b) by 99 days.

(21) Appl. No.: 14/348,975

(22) PCT Filed: Sep. 28, 2012

(86) PCT No.: PCT/IB2012/001908
§ 371 (c)(1),
(2) Date: Apr. 1, 2014

(87) PCT Pub. No.: WO2013/050849
PCT Pub. Date: Apr. 11, 2013

(65) Prior Publication Data
US 2014/0241959 A1 Aug. 28, 2014

(30) Foreign Application Priority Data

Oct. 4, 2011 (IT) .............................. MI2011A1795

(51) Int. Cl.
*B01L 9/06* (2006.01)
(52) U.S. Cl.
CPC ..................................... *B01L 9/06* (2013.01)
(58) Field of Classification Search
None
See application file for complete search history.

(56) References Cited

U.S. PATENT DOCUMENTS 7,628,064 B1 * 12/2009 Miller .................... G01F 22/00
422/63
2004/0086173 A1   5/2004 Itoh
(Continued)

FOREIGN PATENT DOCUMENTS

DE            145 130 A1    11/1980
JP      WO 2010119909 A1 * 10/2010 ............ B01L 3/5453

OTHER PUBLICATIONS

International Search Report for International Application No. PCT/IB2012/001908 filed Sep. 28, 2012 on behalf of Luca Birolini, dated Feb. 25, 2013. 3 pages.
(Continued)

*Primary Examiner* — Benjamin R Whatley
(74) *Attorney, Agent, or Firm* — Steinfl + Bruno LLP

(57) ABSTRACT

The system for management of rack and tube positions for clinical chemistry laboratories includes tubes (10) capable of containing human biological material, a rack (20) configured for receiving and/or holding the tubes (10) to be stocked, a supporting base (30) configured for supporting the rack (20) thereon, a reader (50) configured for reading an identifier ($R_{ID}$) of the rack (20) to be put onto the supporting base (30) and an identifier ($T_{ID}$) of the tube to be put into the rack (20), a camera (40) for detecting the rack (20) on the supporting base (30), and at least one of the tubes (10) into the rack (20), a processing unit (60) for mapping the detected rack (20) into a plurality of allowed positions (Pi) and the detected tube (10) into a tube position (P) included in the plurality of allowed positions (Pi).

20 Claims, 2 Drawing Sheets

(56) References Cited

U.S. PATENT DOCUMENTS

| | | | | |
|---|---|---|---|---|
| 2006/0051239 | A1* | 3/2006 | Massaro | B01L 9/06 |
| | | | | 422/63 |
| 2009/0129990 | A1* | 5/2009 | Kokawa | B01L 9/06 |
| | | | | 422/400 |
| 2010/0261595 | A1* | 10/2010 | Schaefer | B04B 7/08 |
| | | | | 494/20 |
| 2012/0025988 | A1* | 2/2012 | Harada | B01L 3/5453 |
| | | | | 340/572.1 |
| 2013/0028697 | A1* | 1/2013 | Neeper | G01N 35/0099 |
| | | | | 414/751.1 |

OTHER PUBLICATIONS

Written Opinion for International Application No. PCT/IB2012/001908 filed Sep. 28, 2012 on behalf of Luca Birolini, dated Feb. 25, 2013. 5 pages.

* cited by examiner

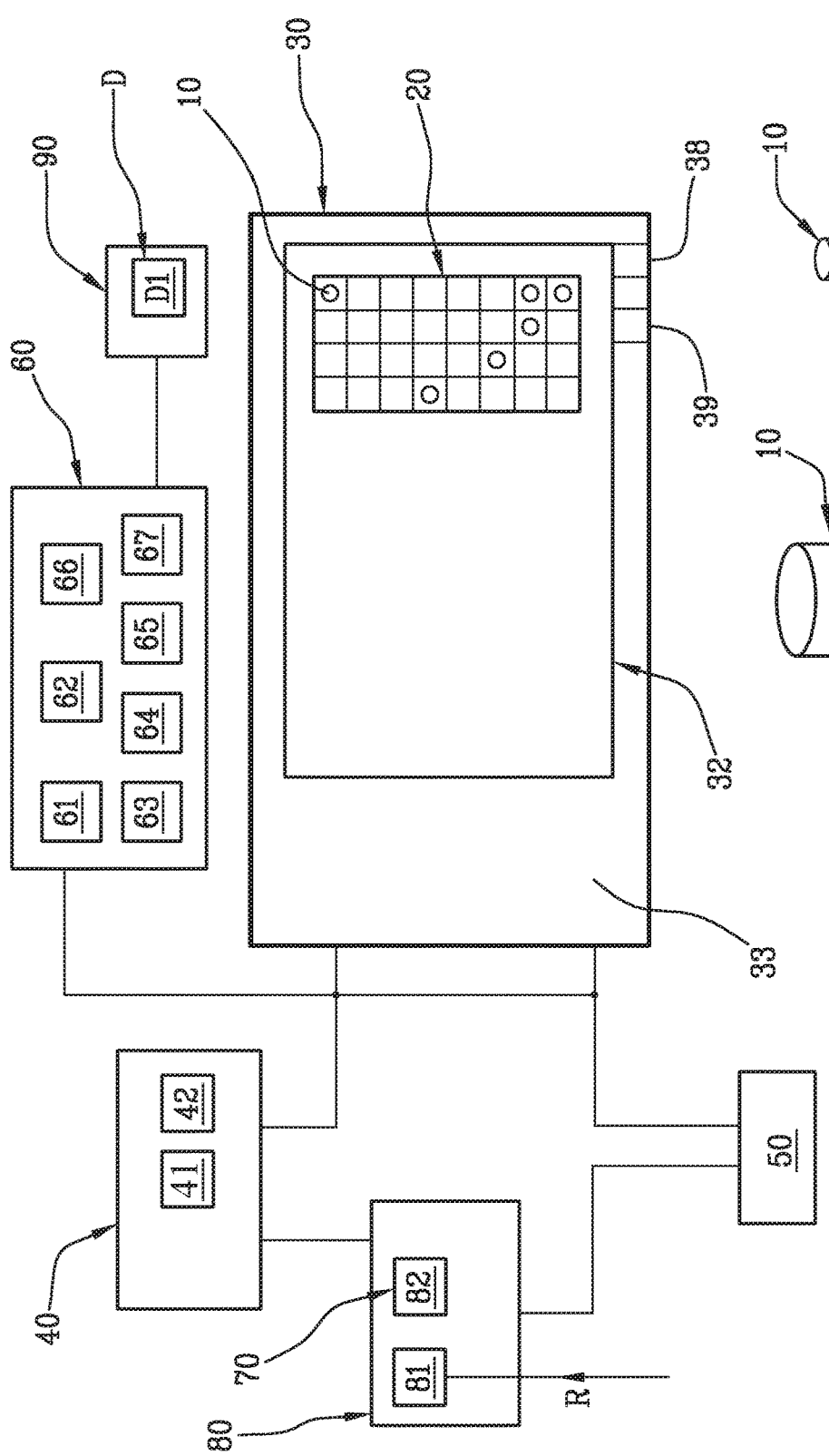

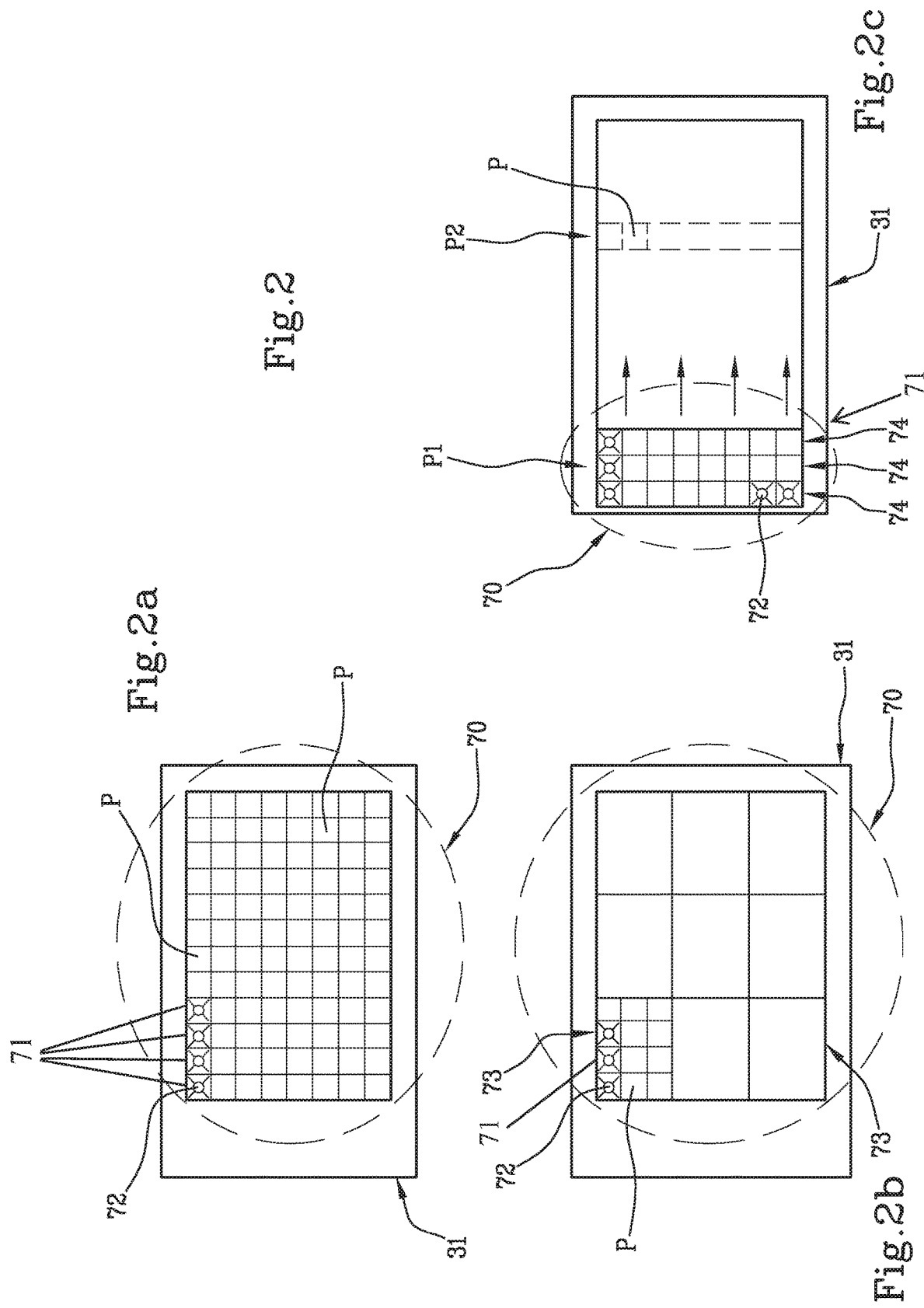

SYSTEM FOR MANAGEMENT OF RACK AND TUBE POSITIONS FOR CLINICAL CHEMISTRY LABORATORIES

FIELD OF THE APPLICATION

The present invention relates to a system for the management of racks and tubes position for clinical chemistry analysis laboratories.

In particular, the invention relates to a system for the position detection of racks and tubes managing insertion and retrieval of racks and tubes within the racks in a specific work area and the following specification is drafted with reference to this field of application.

PRIOR ART

Laboratories personnel lost a lot of time for organizing tubes and retrieving them.

Existing realizations organize racks and tube in different ways depending on the connected application and/or the service to be provided.

A first example of available prior art requires the use of specific racks for stocking tubes; in other words, the tubes can be disposed in predefined racks and the organizing system is provided only to manage tubes in such racks.

The most important drawback of this prior art system is that it is absolutely rigid and it is not able to be configured depending on the rack used.

Another example of available prior art is provided.

A robotized system is able to manage almost any kind of tubes and racks; the robot is able to move tubes to and from different locations.

Unfortunately such a system is technically complex and very expensive rendering its use not convenient for most applications in clinical chemistry analysis laboratories.

Existing realizations, in view of the above cited drawbacks, are only accessible to medium-large laboratory.

The object of the present invention is therefore to provide a system for management of racks and tubes position for clinical chemistry analysis laboratories improved in terms of managing tubes and racks in order to overcome the drawbacks of the described prior art.

SUMMARY OF THE INVENTION

The technical problem is solved, according to the appended claim 1.

The solution of the invention provides the following advantages for the claimed system:
  easiness of construction;
  flexibility in managing tubes and/or racks;
  any type of rack already available in the labs can be used;
  not expensive.

The invention will be explained more in detail in the description provided below and with the help of indicative and not limiting embodiments related to the annexed drawings.

SHORT DESCRIPTION OF THE DRAWINGS

FIG. 1 is a block diagram showing the racks and tubes system of the invention.

FIGS. 1a and 1b show specific components of the system of FIG. 1.

FIG. 2 shows an embodiment of the system of FIG. 1.

DETAILED DESCRIPTION

The system for the management of racks and tubes position for clinical chemistry analysis laboratories of the invention comprises tubes capable of containing human biological material (specimen), a rack configured for receiving and/or holding the tubes to be stocked, a supporting base configured for supporting the rack thereon, reading means configured for read identifiers of the rack and of a tube to be put into the rack, a camera for detecting the presence of the rack on the supporting base and the presence of at least one of the tubes in a specific rack position, a processing unit configured for mapping tubes and rack positions.

With reference to FIGS. 1, 1a and 1b, the system for the management of racks and tubes position of the invention comprises tubes 10 and at least a rack 20 configured for receiving and/or holding the tubes 10.

The tubes 10 and the rack 20 comprise, respectively, tube identifiers $T_{ID}$ and rack identifiers $R_{ID}$ (FIGS. 1a and 1b) configured for identifying tubes and racks in the system.

Tubes 10 are identified depending on the computerised (IT) procedures used in the laboratory.

Specifically, tubes 10 are capable of containing human biological materials (specimen) for clinical chemistry analysis laboratories.

The rack 20 is configured for receiving and/or holding the tubes 10 to be managed in the laboratory.

According to the invention, the rack identifiers $R_{ID}$ comprise one or more among linear barcodes, two dimensional barcodes (i.e. QR codes), RFID tags or the like.

Preferably the rack identifiers $R_{ID}$ comprise coded information about one or more of the following:
  Rack type
  Rack size (in order to make easy the detecting of the rack on the supporting base 30), or the like.

According to the invention, the system for management of racks and tubes position comprises a supporting base 30 (FIG. 1) configured for supporting the rack 20 thereon.

The supporting base 30 will be described in more in detail hereinafter.

It has to be understood that in the following description, when reference is made to a rack 20, it has to be intended a reference to "at least" a rack 20.

According to the invention, the racks and tubes system comprises reading means 50 (FIG. 1) connected to the supporting base 30.

The reading means 50 comprise one or more among a linear barcode scanner, a two-dimensional barcode reader (i.e. a QR reader, an RFID reader, or the like.

According to the invention, the reading means 50 are configured for reading the rack identifier $R_{ID}$ and/or the tube identifier $T_{ID}$.

In other words, the reading means 50, are configured for reading the identifier $R_{ID}$ of a rack 20 to be positioned onto the supporting base 30, and the tube identifier T; of a tube to be put into the identified rack 20 onto the supporting base 30.

The reading means 50 are further configured for transmitting a read rack identifier $R_{ID}$ and a read tube identifier $T_{ID}$ to a processing unit 60 (FIG. 1) that will be described in detail hereinafter.

According to the invention, the system for management of racks and tubes position comprises a camera 40, connected to the supporting base 30.

The camera 40 comprises a first detection module 41 configured for detecting the free positioning of a rack 20 onto the supporting base 30.

The camera 40 further comprises a second detection module 42 configured for detecting at least one of the tubes 10 in the rack 20.

Detection modules are configured for recognizing movements on the supporting area 30 therefore detecting where a rack and or tube read is placed.

The second detection module 42 is configured for detecting the presence of at least one of the tubes 10 in the rack 20 by detecting positioning of the tubes 10 into the rack 20.

As an alternative or additionally, the second detection module 42 is configured for detecting the presence of at least one of the tubes 10 in said rack 20 by detecting movements of the tubes 10 between different positions of the rack 20.

As further alternative or additionally to the previous, the second detection module 42 is configured for detecting the presence of at least one of the tubes 10 in said rack 20 by detecting movements of the tubes 10 between different positions in different racks 20 supported by the supporting base 30.

In this case the system does not need to recognise again the moving tube 10, by scanning the tube identifier $T_{ID}$. The first detection module 41 is configured for detecting also the removal of a rack 20 from the supporting base 30.

The first detection module 41 is further configured for reading the rack identifier $R_{ID}$ of a previously removed rack that is later placed again on the supporting base 30.

A Processing unit 60, that will be described in more detail hereinafter, is configured for automatically check if the tubes 10 on the rack 20 are still present. The mapping of the tubes position can be eventually performed with another system on the specific rack or can be also received from external computerised (IT) procedures.

In this case, an external system indicates tube positions in a rack even if the tubes have not been positioned in rack positions on the supporting base 30 of the invention.

The tubes positions are received by the processing unit 60.

As also stated, according to the invention, the system for the management of racks and tubes position comprises a processing unit 60 configured for processing data about racks 20 and tubes 10.

It has to be realized the in the present description and in the claims, the processing unit 60 is referred to as divided into different functional modules (working modules and memory modules) for the aim to describe in a clear and complete way the functions of the processing unit 60 itself.

Concretely, the processing unit 60 can comprise a single electronic device, with a suitable software for the described functionality, and the different modules can be hardware realizations and/or routines software in the electronic device.

As an alternative or additionally, such functionalities can be carried out by a plurality of electronic devices in which said functional modules can be distributed.

Further, the processing unit can use one or more processors for the processing of the instructions in the modules.

Furthermore, said functional modules can be distributed on different computers locally or remotely as a function of the network architecture in which they are used.

It has to be understood that also the other modules described externally of the processing unit 60 can be a hardware implementation and/or a routine software running in an electronic device.

The processing unit 60 is connected to the camera 40 and to the reading means 50.

The system is configured for recognising an operator by scanning his/her fingerprint.

The processing unit 60 comprises a first association module 61 configured for associating the read rack identifier $R_{ID}$ to rack 20 detected by the camera 40.

The processing unit 60 further comprises a second association module 62 configured for associating the read tube identifier $T_{ID}$ to the tube 10 detected by the camera 40.

Advantageously, according to the invention, the processing unit 60 comprises a first mapping module 63 configured for mapping the detected rack 20 into a plurality of allowed positions Pi on the supporting base 30.

In other words, the first mapping module 63 is configured for recognising the coordinates of the rack positioned on the supporting base 30 and for converting such coordinates in the allowed positions Pi for tubes 10.

The first mapping module 63 is configured for associating in a secondary memory 64 such coordinates and such position Pi.

Advantageously, according to the invention, the processing unit 60 comprises a second mapping module 65 configured for mapping the detected tube 10 into a corresponding tube position P comprised in the plurality of allowed positions Pi.

In other words, the second mapping module 65 is configured for associating a specific coordinate to a position of a tube comprised in the area involved by the rack coordinates.

As will be clear hereinafter, the positions P will be identified in order to permit a retrieval of tubes 10 on a rack 20, for example depending on a request made by an operator.

As far the control unit has been described refers to a first embodiment of the invention wherein no information are shared with external database/memories.

The effect of this specific implementation is that no additional data on racks and tubes are provided except for that read from the rack identifier $R_{ID}$ and the tube identifier $T_{ID}$.

This implementation is referred to as "off-line" implementation.

In a second embodiment of the invention, referred to as "on-line" implementation, the processing unit 60 is connected to an auxiliary memory module 90.

The auxiliary memory module 90 comprises additional data D about the tubes 10 and/or racks 20 in the system.

The additional data D comprise compatibility data D1 of the racks 20 and the tubes 10.

In this case the processing unit 60 further comprises a comparing module 66 configured for comparing the read rack identifier $R_{ID}$ and/or the read tube identifier $T_{ID}$ with the compatibility data D1 in order to check a compatibility between the rack 20 and the tubes 10 in the rack 20 on the supporting base 30.

Compatibility data D1 comprise predefined rack identifiers $PR_{ID}$ and predefined tubes identifiers $PT_{ID}$, representative of a matching between human biological material in the tube 10 and rack 20 holding the tube.

The predefined identifiers $PR_{ID}$, $PT_{ID}$ are representative of a compatibility between tubes 10 and rack 20.

In other words, predefined tubes identifiers $PT_{ID}$ represent tubes that can be positioned in the predefined racks $PR_{ID}$.

Otherwise stated, it is assumed that the processing unit 60 is connected, typically through a serial connection or a network connection, to an external computerised (IT) system that provides information on tube identifiers $T_{ID}$.

The processing unit 60 will support two connectivity workflow: read the tube identifiers $T_{ID}$, send to the external computerised (IT) system a query to ask for download of information related to the $T_{ID}$.

Alternatively, the external computerised (IT) systems send information related to a $T_{ID}$ when available.

Based on such information (minimal set is the $T_{ID}$ and the requested assays for the tube) the processing unit 60 will be able to compute possible destinations (racks types) for the tube supporting next process phases, such as further examinations on the material (specimen) contained.

In the on-line embodiment, the indicating means 70 work also in the phase of positioning of the tubes 10 into the rack 20.

The processing unit 60 is configured for transmitting to lighting means 71 the positions P in the rack to enlighten. As example, enlighten green light means an exact positioning of rack and an identified tube, red light means unidentified tube or rack/tube in wrong position, yellow light means a warning for not set problems.

Conversely, the processing unit 60 is configured for transmitting to lighting means 71 the positions P in the rack through enlightening positions Px and Py provided at the beginning of the row/column of the position P.

In this case, even if the indicating means 70 indicates positions in the rack 20 when no openings are provided in the bottom part of the rack, the position P in the rack is visually identified.

In both embodiments of the invention (on-line and off-line), the racks and tubes system comprises displaying means or display 80 connected to the camera 40.

The displaying means 80 are configured for displaying the rack 20 and the tubes 10 detected by the camera 40 on the supporting base 30.

In other words the displaying means 80 display the rack 20 and tubes 10 in the rack.

Specifically, the displaying means 80 display the rack 20 and positions Pi of the tubes in the rack 20 representative of the position in the rack 20 in which the tube 10 has been really inserted by an operator.

The system according to the invention comprises indicating means or visual indicators 70, configured for indicating the tube positions P.

The processing unit 60 comprises, to this aim, a third mapping module 67 configured for mapping the indicating means 70 into the tube positions P.

The indicating means 70 are configured for indicating at least an allowed inserting position P of a read tube 10 to be inserted in the read rack 20.

Preferably, the rack 20 provides a rectangular surface and the subscripts X and Y refer, respectively, to the raw and column of the inserting position P in the rack.

The indicating means 70 can indicated a plurality of allowed tubes inserting positions Pi.

More, a green light 39 is preferably turned-on on the supporting base 30, preferably on a frame 33 thereof if a tube has been inserted in a corrected position P.

Otherwise, different management of errors can be provided depending on the setting of the system.

In this case, a red light 38 is preferably turned-on on the supporting base 30, preferably on the frame 33 thereof.

In other words, the detection of the rack 20 and tube 10 carried out by the camera 40, following the reading of the identifiers carried out by the reading means 50 and the matching between the rack and tubes identifiers carried out by the comparing module 66, provides a check that the tube 10 has been inserted by an operator in a correct allowed position P in the rack 20.

The system for management of racks and tubes position of the invention provides also the possibility of retrieval a specific tube 10 or a group of tubes 10 from a rack 20 depending on the type of tubes 10, or in relation to the assays or specific operations to be performed.

According to the invention, the system for management of racks and tubes position comprises a retrieval interface 81, preferably on the displaying means 80, configured for receiving a request R of types of tubes 10 to be retrieved.

In this case, indicating means 70 are configured for indicating tube positions P as a function of said request R received by said retrieved interface 81. Preferably, the retrieved interface 81 provides a visual user friendly interface and an operator can select the tubes 10 he wants to be retrieved.

In this case indicating means 70 are configured for indicating positions P of the tubes 10 in the rack 20, as a function of the request R received by the retrieved interface 81.

In a first embodiment of the invention, the indicating means 70 (FIG. 2) are provided in the supporting base 30.

According to the invention, the supporting base 30 comprises a lower body 31 (FIG. 2) configured for containing the indicating means 70 and an upper surface 32 (FIG. 1), mounted on the lower body 31, configured for holding the racks 20.

The upper surface 32 can be also referred to as a working area of the system.

The upper surface 32 is surrounded by a frame 33.

The indicating means 70 comprise the lighting means or light emitters 71, preferably LEDs.

This is the case the indicating means 70 indicate positions in the rack 20 when the bottom part of the rack comprises an opening for every cell (tube position) of the rack. In this way, light generated by lighting means 71 pass through the rack and indicate the positions P of the rack depending on the request R received by the retrieved interface 81.

An operator places tubes 10 in the positions P on the rack enlightened by the lighting means 71.

FIG. 1 shows the upper surface 32, while the lower body 31 is hidden.

In FIGS. 2a, 2b and 2c, three versions of the first embodiment are provided; in such figures, the upper surface 32 has been removed for sake of clarity for better showing the configuration of the lower body 31.

In a first version shown in FIG. 2a, the lighting means 71 comprise a plurality of single LEDs 72 independently mounted on said lower body 31 under the whole area of the upper surface 32.

The technical effect provided by this solution is that each LED 72 can be mounted or removed from the lower body 31 independently from the others.

In a second version shown in FIG. 2b, the lighting means 71 comprise a plurality of LEDs modules 73, in turn comprising a plurality of said single LEDs 72.

The LED modules 73 are mounted on the lower body 31 under the whole area of the upper surface 32.

This solution is cost effective with respect to the first version.

In a third version shown in FIG. 2c, the lighting means 71 comprise at least a LED bar 74, in turn comprising a plurality of single LEDs 72.

The LED bar 74, is mounted on the lower body 31 and adjustable in position under the upper surface 32, in order to indicate different positions of the tubes 10 in the rack 20.

Preferably the LED bar 74 covers a sub area of the lower body 31 and is configured to slide from a first side towards the opposite side of the lower body itself, for example in a direction shown by the arrows in FIG. 2c. LED bars 74 are preferably kept in a first position P1 identified in a portion of the lower body 31 not covered by the upper surface 32.

This first position P1 corresponds to an inactive condition of the single LEDs 72.

Preferably the first position P1 is under the frame 33 of the upper surface 32.

According to the invention, the LED bars 74 are configured for sliding from the first position P1 to a second position P2 identified under the upper surface 32.

This second position P2 corresponds to an active condition of the single LEDs 72 and to positions P depending on the request R.

In an active condition, led bars 74 are configured for sliding from the first position P1 to the second position P2 depending the request R received by the retrieval interface 81, in order to indicate different positions of the tubes 10 in the rack 20.

As an alternative or additionally led bars 74 are configured for sliding from the first position P1 to the second position P2 depending on the rack and tubes identifiers $R_{ID}$, $T_{ID}$ read by the reading means 50, in order to indicate different positions of the tubes 10 in the rack 20.

In a second embodiment of the invention the indicating means 70 are provided on the displaying means 80.

This is the case the indicating means 70 indicate positions in the rack 20 when no openings are provided in the bottom part of the rack.

In this way, light generated by lighting means 71 would not pass through the rack and could not indicate positions P of the rack.

The indicating means 70 comprise highlighting means or highlighters 82 configured for highlighting, on said displaying means 80, said tubes 10 in rack 20, as a function of the request R.

In the on-line embodiment, the indicating means 70 work also in the phase of positioning of the tubes 10 into the rack 20.

An operator places tubes 10 in the positions P on the rack highlighted by the highlighting means 82.

As an alternative or additionally, the highlighting means 82 are configured for highlighting, on said displaying means 80, the tubes 10 in rack 20, as a function of rack and tubes identifiers $R_{ID}$, $T_{ID}$ read by the reading means 50.

The system according to the present invention provides many advantages.

The system is easy in construction and offers an alternative to complex systems.

The system is reduced in size and easy pleaceable.

The system is cost effective with respect to the know systems.

The system can work either on-line or off-line.

In both implementation, it can process any kind of rack.

In the on-line implementation the mapping of the rack can be carried out by an auxiliary remote system. The rack can be already filled with tubes 10 by a previously operating robotised system or by an instrument (a device that process tubes to provide assay's results).

Racks can be freely positioned on the supporting area to be recognised.

The system detects tubes in the rack either when the bottom part of the rack comprises an opening for every cell (tube position) of the rack, or when no openings are provided at all.

In the first case, identification of the detected tubes is carried out by a light, in the second by a displaying on a display.

Many processing units can be coupled in a network in order to create multiple possible way of use of the system The system fast recognises an operator by scanning his/her fingerprint.

The invention claimed is:

1. A system for management of rack and tube positions for clinical chemistry analysis laboratories, comprising:
   (a) at least one tube provided with a corresponding at least one tube identifier;
   (b) a rack for receiving and holding the at least one tube, said rack including a plurality of locations for said at least one tube, said rack provided with a corresponding rack identifier;
   (c) a supporting base for supporting the rack thereon, the rack being freely positionable in any one of a plurality of optically detectable different positions on the supporting base;
   (d) a processing unit;
   (d) a reading device, connected to the supporting base, for reading the rack identifier and the at least one tube identifier and transmitting the rack identifier and the at least one tube identifier to the processing unit; and
   (e) a camera, connected to the supporting base, comprising camera detectors for detecting presence or absence of the rack on the supporting base and, in case of detected rack, detecting i) a rack position of the rack on the supporting base, ii) the at least one tube and iii) a tube position of the at least one tube in the rack, the camera transmitting information about the detected rack, the rack position, the detected at least one tube and the at least one tube position to the processing unit,
   (f) a display connected to said camera, wherein said display displays said detected rack and said detected at least one tube,
   wherein, upon receipt of the rack identifier, the tube identifier, the detected rack, the rack position, the detected at least one tube and the at least one tube position, the processing unit is programmed to:
   1) associate the rack identifier with the detected rack;
   2) associate the at least one tube identifier with the detected at least one tube;
   3) recognize position coordinates of the detected rack on the supporting base and converts the position coordinates to a plurality of allowed positions for the at least one tube; and
   4) associate each of the detected at least one tube position to a corresponding position within the plurality of allowed positions.

2. The system according to claim 1,
   wherein said processing unit is connected to an auxiliary memory comprising compatibility data of said rack and said at least one tube, and
   wherein the processing unit further compares said rack identifier and said tube identifier with said compatibility data to check a compatibility between said detected rack and said detected at least one tube.

3. The system according to claim 1, further comprising visual indicators for indicating tube positions,
   wherein said processing unit associates said visual indicators to said tube positions, and
   wherein said visual indicators highlight on said display said at least one tube in said detected rack, in said tube positions.

4. The system according to claim 3, wherein said supporting base comprises:
 a) a lower body containing said visual indicators; and
 b) an upper surface, mounted on said lower body, said upper surface being configured for supporting said rack.

5. The system according to claim 4, wherein said visual indicators comprise a plurality of single LEDs independently mounted on said lower body under the whole area of said upper surface.

6. The system according to claim 4, wherein said visual indicators comprise a plurality of LED modules, in turn comprising a plurality of single LEDs, said LED modules being mounted on said lower body under the whole area of said upper surface.

7. The system according to claim 4, wherein said visual indicators comprise at least one LED bar, in turn comprising a plurality of single LEDs, said LED bar being mounted on said lower body and adjustable in position under said upper surface, in order to indicate different positions of said at least one tube in said rack.

8. The system according to claim 3, further comprising a retrieval interface configured for receiving a request of a type of said at least one tube to be retrieved.

9. The system according to claim 8, wherein said visual indicators are configured for indicating tube positions as a function of said request received by said retrieval interface.

10. The system according to claim 1, wherein said at least one tube identifier and said rack identifier comprise linear barcodes, two dimensional barcodes or RFID tags.

11. The system according to claim 2, further comprising visual indicators for indicating tube positions, wherein said processing unit associates said visual indicators to said tube positions.

12. The system according to claim 10, further comprising visual indicators for indicating tube positions, wherein said processing unit associates said visual indicators to said tube positions.

13. The system according to claim 1, wherein said rack identifier comprises information about one or more of a rack type or a rack size.

14. A system for management of rack and tube positions for clinical chemistry analysis laboratories, comprising:
 (a) at least one tube provided with a corresponding at least one tube identifier;
 (b) a rack for receiving and holding the at least one tube, said rack including a plurality of locations for said at least one tube, said rack provided with a corresponding rack identifier;
 (c) a supporting base for supporting the rack thereon, the rack being freely positionable in any one of a plurality of optically detectable different positions on the supporting base;
 (d) a processing unit;
 (d) a reading device, connected to the supporting base, for reading the rack identifier and the at least one tube identifier and transmitting the rack identifier and the at least one tube identifier to the processing unit; and
 (e) a camera, connected to the supporting base, comprising camera detectors for detecting presence or absence of the rack on the supporting base and, in case of detected rack, detecting i) a rack position of the rack on the supporting base, ii) the at least one tube and iii) a tube position of the at least one tube in the rack, the camera transmitting information about the detected rack, the rack position, the detected at least one tube and the at least one tube position to the processing unit,
 (f) visual indicators for indicating tube positions,
 wherein, upon receipt of the rack identifier, the tube identifier, the detected rack, the rack position, the detected at least one tube and the at least one tube position, the processing unit is programmed to:
 1) associate the rack identifier with the detected rack;
 2) associate the at least one tube identifier with the detected at least one tube;
 3) recognize position coordinates of the detected rack on the supporting base and converts the position coordinates to a plurality of allowed positions for the at least one tube;
 4) associate each of the detected at least one tube position to a corresponding position within the plurality of allowed positions; and
 5) associate said visual indicators to said tube positions.

15. The system according to claim 14, wherein said supporting base comprises:
 a) a lower body containing said visual indicators; and
 b) an upper surface, mounted on said lower body, said upper surface being configured for supporting said rack.

16. The system according to claim 15, wherein said visual indicators comprise a plurality of LEDs mounted on said lower body under said upper surface.

17. The system according to claim 14, further comprising a retrieval interface configured for receiving a request of a type of said at least one tube to be retrieved.

18. The system according to claim 17, wherein said visual indicators are configured for indicating tube positions as a function of said request received by said retrieval interface.

19. The system according to claim 14, wherein said at least one tube identifier and said rack identifier comprise linear barcodes, two dimensional barcodes or RFID tags.

20. The system according to claim 14, wherein said rack identifier comprises information about one or more of a rack type or a rack size.

* * * * *